US006646257B1

(12) United States Patent
Fischer et al.

(10) Patent No.: US 6,646,257 B1
(45) Date of Patent: Nov. 11, 2003

(54) MULTIMODE IONIZATION SOURCE

(75) Inventors: Steven M. Fischer, Hayward, CA (US); Darrell L. Gourley, San Francisco, CA (US); James L. Bertsch, Palo Alto, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/245,987

(22) Filed: Sep. 18, 2002

(51) Int. Cl.[7] .......................... B01D 59/44; H01J 49/00
(52) U.S. Cl. ....................... 250/288; 250/281; 250/282
(58) Field of Search ................................ 250/288, 281, 250/282

(56) References Cited

U.S. PATENT DOCUMENTS

| | | | |
|---|---|---|---|
| 3,886,365 | A | 5/1975 | Kruger et al. |
| 3,992,632 | A | 11/1976 | Kruger et al. |
| 4,105,916 | A | 8/1978 | Siegel |
| RE30,171 | E | 12/1979 | Kruger et al. |
| 4,266,127 | A | 5/1981 | Chang |
| 4,377,745 | A | 3/1983 | Chang |
| 5,581,081 | A | 12/1996 | Kato et al. |
| 5,668,370 | A | 9/1997 | Yano et al. |
| 5,808,308 | A | 9/1998 | Holkeboer |
| 6,236,042 | B1 | 5/2001 | Kato et al. |
| 6,339,218 | B1 | 1/2002 | Kato et al. |
| 6,350,617 | B1 | 2/2002 | Hindsgaul et al. |

FOREIGN PATENT DOCUMENTS

| | | |
|---|---|---|
| WO | WO 01/97252 | 12/2001 |

*Primary Examiner*—John R. Lee
*Assistant Examiner*—Erin-Michael Gill
(74) *Attorney, Agent, or Firm*—Timothy H. Joyce

(57) ABSTRACT

The present invention provides an apparatus and method for use with a mass spectrometer. The multimode ionization source of the present invention provides one or more atmospheric pressure ionization sources (i.e. electrospray, atmospheric pressure chemical ionization and/or atmospheric pressure photoionization) for ionizing molecules. A method of producing ions using the multimode ionization source is also disclosed. The apparatus and method provide the advantages of the combined ion sources without the inherent disadvantages of the individual sources.

17 Claims, 5 Drawing Sheets

MULTIMODE IONIZATION SOURCE

TECHNICAL FIELD

The invention relates generally to the field of mass spectrometry and more particularly toward an atmospheric pressure ion source (API) that incorporates multiple ion formation techniques into a single source.

BACKGROUND

Mass spectrometers work by ionizing molecules and then sorting and identifying the molecules based on their mass-to-charge (m/z) ratios. Two key components in this process include the ion source, which generates ions, and the mass analyzer, which sorts the ions. Several different types of ion sources are available for mass spectrometers. Each ion source has particular advantages and is suitable for use with different classes of compounds. Different types of mass analyzers are also used. Each has advantages and disadvantages depending upon the type of information needed.

Much of the advancement in liquid chromatography/mass spectrometry (LC/MS) over the last ten years has been in the development of new ion sources and techniques that ionize analyte molecules and separate the resulting ions from the mobile phase. Earlier LC/MS systems performed at sub-atmospheric pressures or under partial vacuum, whereas API occurs at atmospheric pressure. In addition, historically in these older systems all components were generally under vacuum, whereas API occurs external to the vacuum and the ions are then transported into the vacuum.

Previous approaches were successful only for a very limited number of compounds. The introduction of API techniques greatly expanded the number of compounds that can be successfully analyzed using LC/MS. In this technique, analyte molecules are first ionized at atmospheric pressure. The analyte ions are then spatially and electrostatically separated from neutral molecules. Common API techniques include: electrospray ionization (ESI), atmospheric pressure chemical ionization (APCI) and atmospheric pressure photoionization (APPI). Each of these techniques has particular advantages and disadvantages.

Electrospray ionization is the oldest technique and relies in part on chemistry to generate analyte ions in solution before the analyte reaches the mass spectrometer. The LC eluent is sprayed (nebulized) into a chamber at atmospheric pressure in the presence of a strong electrostatic field and heated drying gas. The electrostatic field charges the LC eluent and the analyte molecules. The heated drying gas causes the solvent in the droplets to evaporate. As the droplets shrink, the charge concentration in the droplets increases. Eventually, the repulsive force between ions with like charges exceeds the cohesive forces and the ions are ejected (desorbed) into the gas phase. The ions are attracted to and pass through a capillary or sampling orifice into the mass analyzer. Some gas-phase reactions, mostly proton transfer and charge exchange, can also occur between the time ions are ejected from the droplets and the time they reach the mass analyzer.

Electrospray is particularly useful for analyzing large biomolecules such as proteins, oligonucleotides, peptides etc. The technique can also be useful for analyzing polar smaller molecules such as benzodiazepines and sulfated conjugates. Other compounds that can be effectively analyzed include ionizing salts and organic dyes.

Large molecules often acquire more than one charge. Multiple charging provides the advantage of allowing analysis of molecules as large as 150,000 u even though the mass range (or more accurately mass-to-charge range) for a typical LC/MS instrument is around 3000 m/z. When a large molecule acquires many charges, a mathematical process called deconvolution may be used to determine the actual molecular weight of the analyte.

A second common technique performed at atmospheric pressure is atmospheric pressure chemical ionization (APCI). In APCI, the LC eluent is sprayed through a heated vaporizer (typically 250–400° C.) at atmospheric pressure. The heat vaporizes the liquid and the resulting gas phase solvent molecules are ionized by electrons created in a corona discharge. The solvent ions then transfer the charge to the analyte molecules through chemical reactions (chemical ionization). The analyte ions pass through a capillary or sampling orifice into the mass analyzer. APCI has a number of important advantages. The technique is applicable to a wide range of polar and nonpolar molecules. The technique rarely results in multiple charging like electrospray and is, therefore, particularly effective for use with molecules of less than 1500 u. For these reasons and the requirement of high temperatures, APCI is a less useful technique than electrospray in regards to large biomolecules that may be thermally unstable. APCI is used with normal-phase chromatography more often than electrospray is because the analytes are usually nonpolar.

Atmospheric pressure photoionization for LC/MS is a relatively new technique. As in APCI, a vaporizer converts the LC eluent to the gas phase. A discharge lamp generates photons in a narrow range of ionization energies. The range of energies is carefully chosen to ionize as many analyte molecules as possible while minimizing the ionization of solvent molecules. The resulting ions pass through a capillary or sampling orifice into the mass analyzer. APPI is applicable to many of the same compounds that are typically analyzed by APCI. It shows particular promise in two applications, highly nonpolar compounds and low flow rates (<100 ul/min), where APCI sensitivity is sometimes reduced. In all cases, the nature of the analyte(s) and the separation conditions have a strong influence on which ionization technique: electrospray, APCI, or APPI will generate the best results. The most effective technique is not always easy to predict.

Each of these techniques described above ionizes molecules through a different mechanism. Unfortunately, none of these techniques are universal sample ion generators. While many times the lack of universal ionization could be seen as a potential advantage, it presents a serious disadvantage to the analyst responsible for rapid analysis of samples that are widely divergent. An analyst faced with very limited time and a broad array of numerous samples to analyze is interested in an ion source capable of ionizing as many kinds of samples as possible with a single technique and set of conditions. Unfortunately, such an API ion source technique has not been available.

Attempts have been made to improve sample ionization coverage by the use of rapid switching between positive and negative ion detection. Rapid positive/negative polarity switching does result in an increase in the percentage of compounds detected by any API technique. However, it does not eliminate the need for more universal API ion generation.

For these reasons it would be desirable to employ a source that can provide the benefits of multiple sources (electrospray, APCI, and APPI) combined, but not have the individual limitations. In addition, it would be desirable to have a source which does not require switching from one source to another source or which requires manual operations to engage the source. Thus, there is a need to provide a multimode ion source that can ionize a variety of samples quickly, efficiently and effectively.

BRIEF DESCRIPTION OF THE FIGURES

The invention is described in detail below with reference to the following figures.

DETAILED DESCRIPTION OF THE INVENTION

Figure 1:
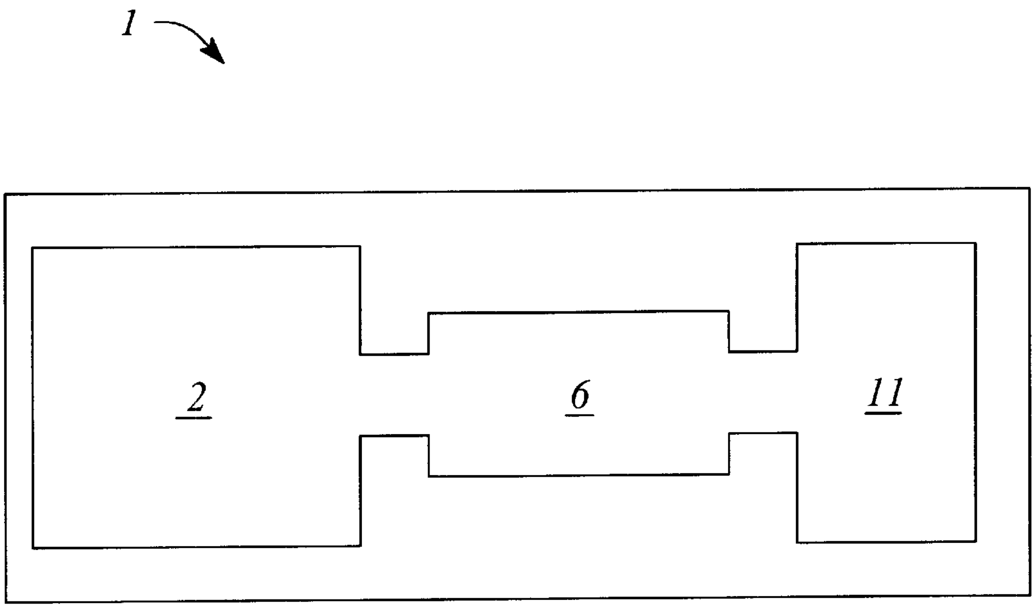
FIG. 1 shows a general block diagram of a mass spectrometer.

Before describing the invention in detail, it must be noted that, as used in this specification and the appended claims, the singular forms "a," "an," and "the" include plural referents unless the context clearly dictates otherwise. Thus, for example, reference to "a conduit" includes more than one "conduit". Reference to an "electrospray ionization source" or an "atmospheric pressure ionization source" includes more than one "electrospray ionization source" or "atmospheric pressure ionization source". In describing and claiming the present invention, the following terminology will be used in accordance with the definitions set out below.

The term "adjacent" means near, next to or adjoining. Something adjacent may also be in contact with another component, surround (i.e. be concentric with) the other component, be spaced from the other component or contain a portion of the other component. For instance, a "drying device" that is adjacent to a nebulizer may be spaced next to the nebulizer, may contact the nebulizer, may surround or be surrounded by the nebulizer or a portion of the nebulizer, may contain the nebulizer or be contained by the nebulizer, may adjoin the nebulizer or may be near the nebulizer.

The term "conduit" refers to any sleeve, capillary, transport device, dispenser, nozzle, hose, pipe, plate, pipette, port, orifice, orifice in a wall, connector, tube, coupling, container, housing, structure or apparatus that may be used to receive or transport ions or gas.

The term "corona needle" refers to any conduit, needle, object, or device that may be used to create a corona discharge.

The term "molecular longitudinal axis" means the theoretical axis or line that can be drawn through the region having the greatest concentration of ions in the direction of the spray. The above term has been adopted because of the relationship of the molecular longitudinal axis to the axis of the conduit. In certain cases a longitudinal axis of an ion source or electrospray nebulizer may be offset from the longitudinal axis of the conduit (the theoretical axes are orthogonal but not aligned in 3 dimensional space). The use of the term "molecular longitudinal axis" has been adopted to include those embodiments within the broad scope of the invention. To be orthogonal means to be aligned perpendicular to or at approximately a 90 degree angle. For instance, the "molecular longitudinal axis" may be orthogonal to the axis of a conduit. The term substantially orthogonal means 90 degrees ±20 degrees. The invention, however, is not limited to those relationships and may comprise a variety of acute and obtuse angles defined between the "molecular longitudinal axis" and longitudinal axis of the conduit.

The term "nebulizer" refers to any device known in the art that produces small droplets or an aerosol from a liquid.

The term "first electrode" refers to an electrode of any design or shape that may be employed adjacent to a nebulizer or electrospray ionization source for directing or limiting the plume or spray produced from an ESI source, or for increasing the field around the nebulizer to aid charged droplet formation.

The term "second electrode" refers to an-electrode of any design or shape that may be employed to direct ions from a first electrode toward a conduit.

The term "drying device" refers to any heater, nozzle, hose, conduit, ion guide, concentric structure, infrared (IR) lamp, u-wave lamp, heated surface, turbo spray device, or heated gas conduit that may dry or partially dry an ionized vapor. Drying the ionized vapor is important in maintaining or improving the sensitivity of the instrument.

The term "ion source" or "source" refers to any source that produces analyte ions.

The term "ionization region" refers to an area between any ionization source and the conduit.

The term "electrospray ionization source" refers to a nebulizer and associated parts for producing electrospray ions. The nebulizer may or may not be at ground potential. The term should also be broadly construed to comprise an apparatus or device such as a tube with an electrode that can discharge charged particles that are similar or identical to those ions produced using electrospray ionization techniques well known in the art.

The term "atmospheric pressure ionization source" refers to the common term known in the art for producing ions. The term has further reference to ion sources that produce ions at ambient temperature and pressure ranges. Some typical ionization sources may include, but not be limited to electrospray, APPI and APCI ion sources.

The term "detector" refers to any device, apparatus, machine, component, or system that can detect an ion. Detectors may or may not include hardware and software. In a mass spectrometer the common detector includes and/or is coupled to a mass analyzer.

The term "sequential" or "sequential alignment" refers to the use of ion sources in a consecutive arrangement. Ion sources follow one after the other. This may or may not be in a linear arrangement.

The invention is described with reference to the figures. The figures are not to scale, and in particular, certain dimensions may be exaggerated for clarity of presentation.

FIG. 1 shows a general block diagram of a mass spectrometer. The block diagram is not to scale and is drawn in, a general format because the present invention may be used with a variety of different types of mass spectrometers. A mass spectrometer 1 of the present invention comprises a multimode ion source 2, a transport system 6 and a detector 11. The invention in its broadest sense provides an increased ionization range of a single API ion source and incorporates multiple ion formation mechanisms into a single source. In one embodiment this is accomplished by combining ESI functionality with one or more APCI and/or APPI functionalities. Analytes not ionized by the first ion source or functionality should be ionized by the second ion source or functionality.

Figure 2:
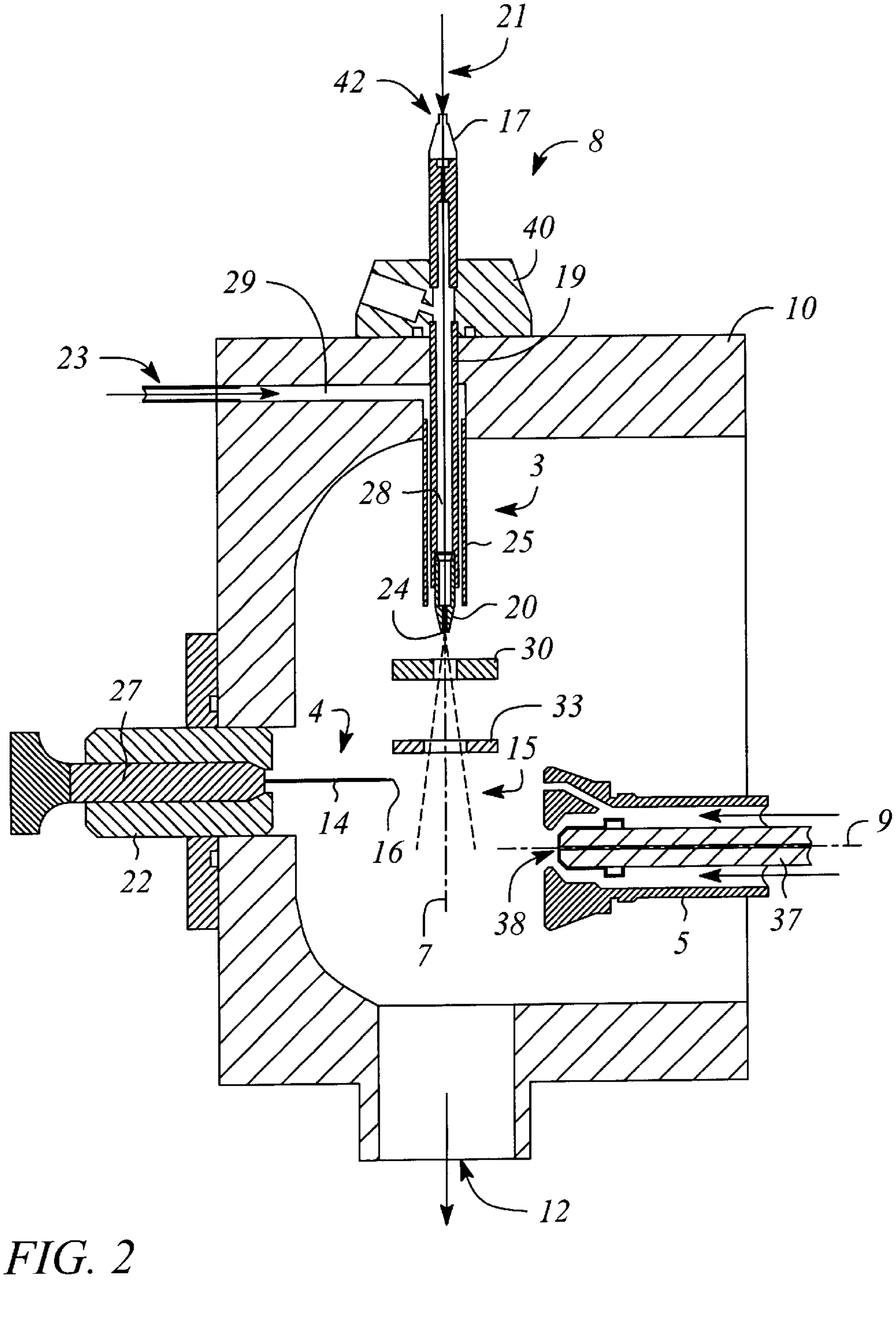
FIG. 2 shows an enlarged cross-sectional view of a first embodiment of the invention.

Referring to FIGS. 1 and 2, the multimode ion source 2 comprises a first ion source 3 and a second ion source 4 downstream from the first ion source 3. The first ion source 3 may be separated spatially or integrated with the second ion source 4. The first ion source 3 may also be in sequential alignment with the second ion source 4. Sequential alignment, however, is not required. The term "sequential" or "sequential alignment" refers to the use of ion sources in a consecutive arrangement. Ion sources follow one after the other. This may or may not be in a linear arrangement. When the first ion source 3 is in sequential alignment with second ion source 4, the ions must pass from the first ion source 3 to the second ion source 4. The second ion source 4 may comprise all or a portion of multimode ion source 2, all or a portion of transport system 6 or all or a portion of both.

The first ion source 3 may comprise an atmospheric pressure ion source and the second ion source 4 may also comprise one or more atmospheric pressure ion sources. It is important to the invention that the first ion source 3 be an electrospray ion source or similar type device in order to provide charged droplets and ions in an aerosol form. In addition, the electrospray technique has the advantage of providing multiply charged species that can be later detected and deconvoluted to characterize large molecules such as proteins. The first ion source 3 may be located in a number of positions, orientations or locations within the multimode ion source 2. The figures show the first ion source 3 in an orthogonal arrangement to a conduit 37 (shown as a capillary). To be orthogonal means that the first ion source 3 has a "molecular longitudinal axis" 7 that is perpendicular to the conduit longitudinal axis 9 of the conduit 37 (See FIG. 2 for a clarification). The term "molecular longitudinal axis",means the theoretical axis or line that-can be drawn through the region having the greatest concentration of ions in the direction of the spray. The above term has been adopted because of the relationship of the "molecular longitudinal axis" to the axis of the conduit. In certain cases a longitudinal axis of an ion source or electrospray nebulizer may be offset from the longitudinal axis of the conduit (the theoretical axes are orthogonal but not aligned in three dimensional space). The use of the term "molecular longitudinal axis" has been adopted to include those offset embodiments within the broad scope of the invention. The term is also defined to include situations (two dimensional space) where the longitudinal axis of the ion source and/or nebulizer is substantially orthogonal to the conduit longitudinal axis 9 (as shown in the figures). In addition, although the figures show the invention in a substantially orthogonal arrangement (molecular longitudinal axis is essentially orthogonal to longitudinal axis of the conduit), this is not required. A variety of angles (obtuse and acute) may be defined between the molecular longitudinal axis and the longitudinal axis of the conduit.

FIG. 2 shows a cross-sectional view of a first embodiment of the invention. The figure shows additional details of the multimode ion source 2. Multimode ion source 2 comprises a first ion source 3, a second ion source 4 and conduit 37 all enclosed in a single source housing 10. The figure shows the first ion source 3 is closely coupled and integrated with the second ion source 4 in the source housing 10. Although the source housing 10 is shown in the figures, it is not a required element of the invention. It is anticipated that the ion sources may be placed in separate housings or even be used in an arrangement where the ion sources are not used with the source housing 10 at all. It should be mentioned that although the source is normally operated at atmospheric pressure (around 760 Torr) it can be maintained alternatively at pressures from about 20 to about 2000 Torr. The source housing 10 has an exhaust port 12 for removal of gases.

The first ion source 3 (shown as an electrospray ion source in FIG. 2) comprises a nebulizer 8 and drying device 23. Each of the components of the nebulizer 8 may be separate or integrated with the source housing 10 (as shown in FIGS. 2–5). In the case when the nebulizer 8 is integrated with the source housing 10, a nebulizer coupling 40 may be employed for attaching nebulizer 8 to the source housing 10.

The nebulizer 8 comprises a nebulizer conduit 19, nebulizer cap 17 having a nebulizer inlet 42 and a nebulizer tip 20. The nebulizer conduit 19 has a longitudinal bore 28 that runs from the nebulizer cap 17 to the nebulizer tip 20 (figure shows the conduit in a split design in which the nebulizer conduit 19 is separated into two pieces with bores aligned). The longitudinal bore 28 is designed for transporting sample 21 to the nebulizer tip 20 for the formation of the charged aerosol that is discharged into an ionization region 15. The nebulizer 8 has an orifice 24 for formation of the charged aerosol that is discharged to the ionization region 15. A drying device 23 provides a sweep gas to the charged aerosol produced and discharged from nebulizer tip 20. The sweep gas may be heated and applied directly or indirectly to the ionization region 15. A sweep gas conduit 25 may be used to provide the sweep gas directly to the ionization region 15. The sweep gas conduit 25 may be attached or integrated with source housing 10 (as shown in FIG. 2). When sweep gas conduit 25 is attached to the source housing 10, a separate source housing bore 29 may be employed to direct the sweep gas from the sweep gas source 23 toward the sweep gas conduit 25. The sweep gas conduit 25 may comprise a portion of the nebulizer conduit 19 or may partially or totally enclose the nebulizer conduit 19 in such a way as to deliver the sweep gas to the aerosol as it is produced from the nebulizer tip 20.

It should be noted that it is important to establish an electric field at the nebulizer tip 20 to charge the ESI liquid. The nebulizer tip 20 must be small enough to generate the high field strength. The nebulizer tip 20 will typically be 100 to 300 microns in diameter. In the case that the second ion source 4 is an APCI ion source, the voltage at the corona needle 14 will be between 500 to 6000 V with 4000 V being typical. This field is not critical for APPI, because a photon source usually does not affect the electric field at the nebulizer tip 20. If the second ion source 4 of the multimode ion source 2 is an APCI source, the field at the nebulizer needs to be isolated from the voltage applied to the corona needle 14 in order not to interfere with the initial ESI process. In the above mentioned embodiment (shown in FIG. 2) a nebulizer at ground is employed. This design is safer for the user and utilizes a lower current, lower cost power supply (power supply not shown and described).

In one embodiment where the second ion source 4 is an APCI ion source, an optional first electrode 30 and a second electrode 33 are employed adjacent to the first ion source 3 (See FIG. 2; For further information regarding the electrodes described herein, See application No. 09/579,276, entitled "Apparatus for Delivering Ions from a Grounded Electrospray Assembly to a Vacuum Chamber"). A potential difference between the nebulizer tip 20 and first electrode 30 creates the electric field that produces the charged aerosol at the tip, while the potential difference between the second electrode 33 and the conduit 37 creates the electric field for directing or guiding the ions toward conduit 37. A corona discharge is produced by a high electric field at the corona needle 14, the electric field being produced predominately by the potential difference between corona needle 14 and conduit 37, with some influence by the potential of second electrode 33. By way of illustration and not limitation, a typical set of potentials on the various electrodes could be: nebulizer tip 20 (ground); first electrode 30 (−1 kV); second electrode 33 (ground); corona needle 14 (+3 kV); conduit 37 (−4 kV). These example potentials are for the case of positive ions; for negative ions, the signs of the potentials are reversed. The electric field between first electrode 30 and second electrode 33 is decelerating for positively charged ions and droplets so the sweep gas is used to push them against the field and ensure that they move through second electrode 33.

Since the electric fields are produced by potential differences, the choice of absolute potentials on electrodes is substantially arbitrary as long as appropriate potential differences are maintained. As an example, a possible set of potentials could be: nebulizer tip 20 (+4 kV); first electrode 30 (+3 kV); second electrode 33 (+4 kV); corona needle 14 (+7 kV); conduit 37 (ground). Choices of potentials, though arbitrary, are usually dictated by convenience and by practical aspects of instrument design.

Figure 4:
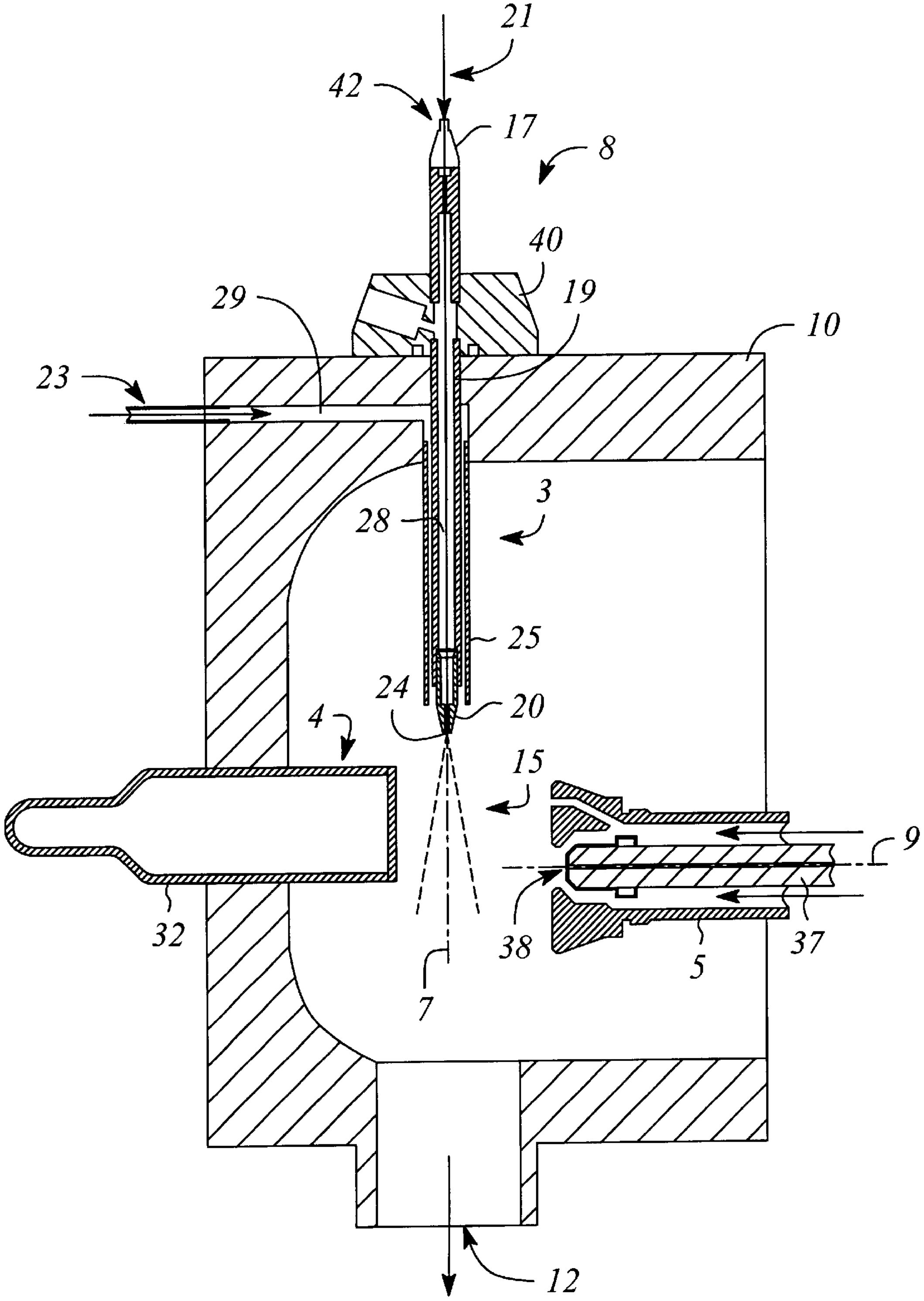
FIG. 4 shows an enlarged cross-sectional view of a third embodiment of the invention.
Figure 5:
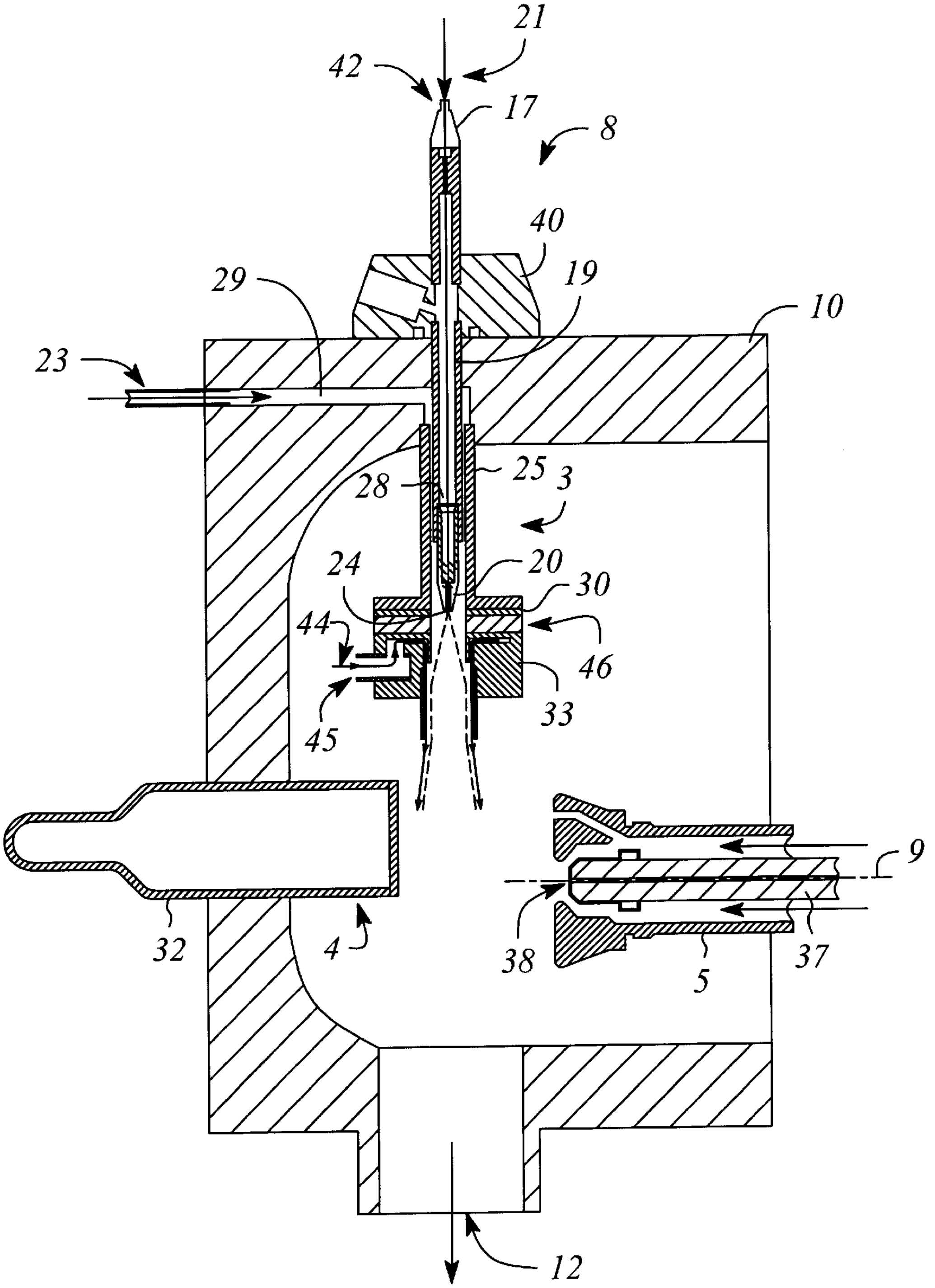
FIG. 5 shows an enlarged cross-sectional view of a fourth embodiment of the invention.

Use of APPI for second ion source 4 is a different situation from use of APCI since it does not require electric fields to assist in the ionization process. FIG. 4 shows a cross-sectional view of an embodiment of the invention that employs APPI and that is described in detail below. As shown in FIG. 5, embodiments that use APPI for the second source 4 may also include a first electrode 30 and a second electrode 33 to guide ions generated by the first ion source.

The electric field between the nebulizer tip 20 and the conduit 37 serves both to create the electrospray and to move the ions to the conduit 37, as in a standard electrospray ion source. A positive potential of, for example, one or more kV can be applied to the nebulizer tip 20 with conduit 37 maintained near or at ground potential, or a negative potential of, for example, one-or more kV can be applied to conduit 37 with nebulizer tip 20 held near or at ground potential (polarities are reversed for negative ions). In either case, the ultraviolet (UV) lamp 32 has very little influence on the electric field if it is at sufficient distance from the conduit 37 and the nebulizer tip 20. Alternatively, the lamp can be masked by another electrode or casing at a suitable potential of value between that of the conduit 37 and that of the nebulizer tip 20.

The drying device 23 is positioned adjacent to the nebulizer 8 and is designed for drying the charged aerosol that is produced by the first ion source 3. The drying device 23 for drying the charged aerosol is selected from the group consisting of an infrared (IR) lamp, a heated surface, a turbo spray device, a microwave lamp and a heated gas conduit. It should be noted that the drying of the ESI aerosol is a critical step. If the aerosol does not under go sufficient drying to liberate the nonionized analyte, the APCI or APPI process will not be effective. The drying must be done in such a manner as to avoid losing the ions created by electrospray. Ions can be lost by discharging to a surface or by allowing the ions to drift out of the useful ion sampling volume. The drying solution must deal with both issues. A practical means to dry and confine a charged aerosol and ions is to use hot inert gas. Electric fields are only marginally effective at atmospheric pressure for ion control. An inert gas will not dissipate the charge and it can be a source of heat. The gas can also be delivered such that is has a force vector that can keep ions and charged drops in a confined space. This can be accomplished by the use of gas flowing parallel and concentric to the aerosol or by flowing gas perpendicular to the aerosol. The drying device 23 may provide a sweep gas to the aerosol produced from nebulizer tip 20. In one embodiment the drying device 23 may comprise a gas source or other device to provide heated gas. Gas sources are well known in the art and are described elsewhere. The drying device 23 may be a separate component or may be integrated with source housing 10. The drying device 23 may provide a number of gases by means of nebulizer conduit 25. For instance, gases such as nitrogen, argon, xenon, carbon dioxide, air, helium etc. may be used with the present invention. The gas need not be inert and should be capable of carrying a sufficient amount of energy or heat. Other gases well known in the art that contain these characteristic properties may also be used with the present invention. In other embodiments, the sweep gas and drying gas may have different or separate points of introduction. For instance, the sweep gas may be introduced by using the same conduits (as shown in FIGS. 2 and 4) or different conduits (FIGS. 3 and 5) and then a separate nebulizing gas may be added to the system further downstream from the point of introduction of the sweep gas. Alternative points of gas introduction (conduits, ports etc.) may provide for increased flexibility to maintain or alter gas/components and temperatures. The second ion source 4 may comprise an APCI or APPI ion source. FIG. 2 shows the second ion source 4 when it is in the APCI configuration. The second ion source 4 may then comprise, as an example embodiment (but not a limitation), a corona needle 14, corona needle holder 22, and coronal needle jacket 27. The corona needle 14 may be disposed in the source housing 10 downstream from the first ion source 3. The electric field due to a high potential on the corona needle 14 causes a corona discharge that causes further ionization, by APCI processes, of analyte in the vapor stream flowing from the first ion source 3. For positive ions, a positive corona is used, wherein the electric field is directed from the corona needle to the surroundings. For negative ions, a negative corona is used, with the electric field directed toward the corona needle 14. The mixture of analyte ions, vapor and aerosol flows from the first ion source 3 into the ionization region 15, where it is subjected to further ionization by APCI or APPI processes. The drying or sweep gas described above comprises ones means for transport of the mixture from the first ion source 3 to the ionization region 15.

Figure 3:
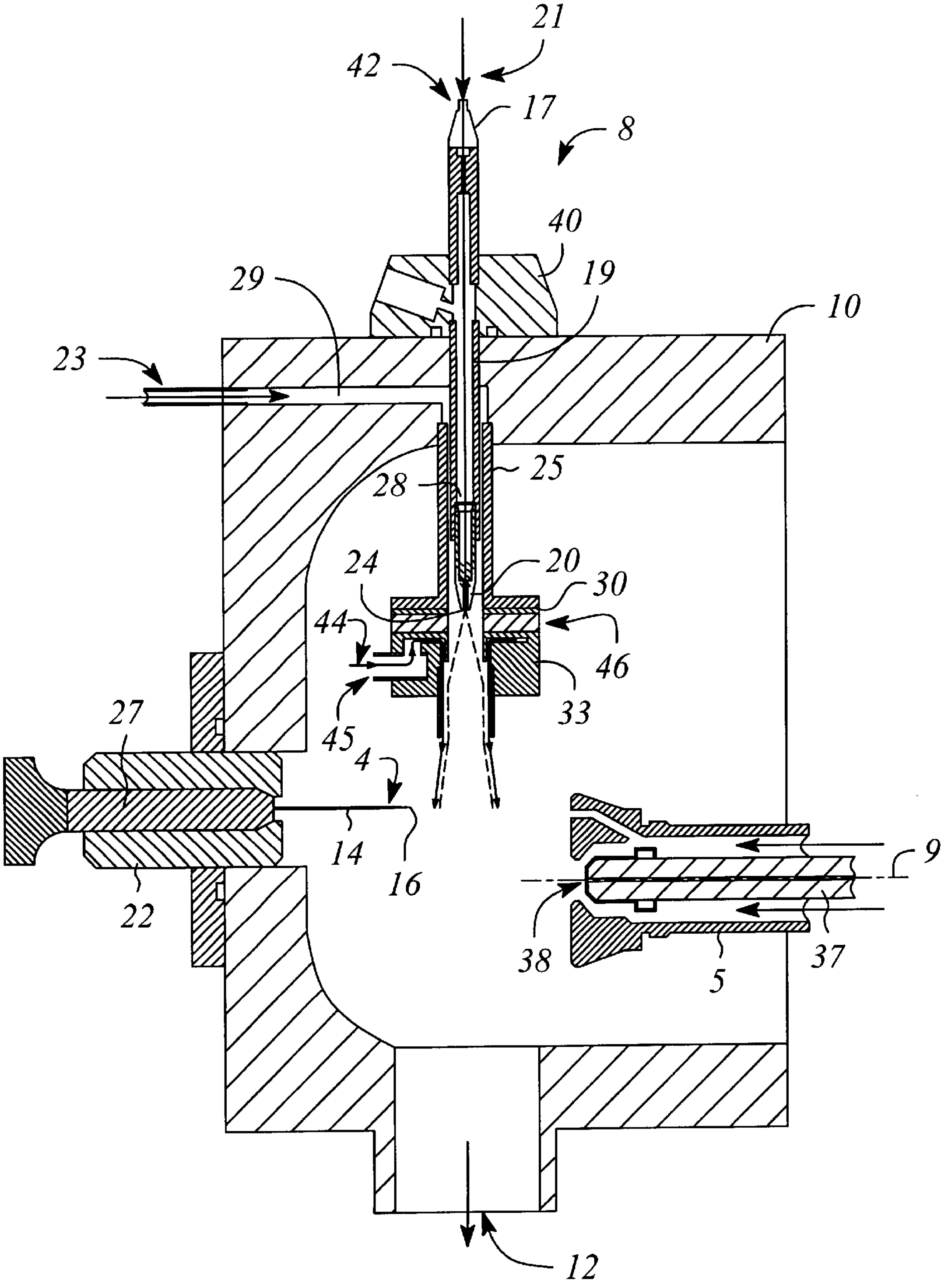
FIG. 3 shows an enlarged cross-sectional view of a second embodiment of the invention.

FIG. 3 shows a similar embodiment to FIG. 2, but comprises a design for various points of introduction of a sweep gas, a nebulizing gas and a drying gas. The gases may be combined to dry the charged aerosol. As described above, the nebulizing and sweep gas may be introduced as discussed. However, in this design the drying gas may be introduced in one or more drying gas sources 44 by means of the drying gas port(s) 45 and 46. The figure shows the drying gas source 44 and drying gas port(s) 45 and 46, comprising part of second electrode 33. This is not a requirement and these components may be incorporated separately into or as part of the source housing 10.

FIG. 4 shows a similar embodiment to FIG. 2, but comprises a different second ion source 4. In addition, in this embodiment, the optional first electrode 30 and second electrode 33 are not employed. The second ion source 4 comprises an APPI ion source. An ultraviolet lamp 32 is interposed between the first ion source 3 and the conduit 37. The ultraviolet lamp 32 may comprise any number of lamps that are well known in the art that are capable of ionizing molecules. A number of UV lamps and APPI sources are known and employed in the art and may be employed with the present invention. The second ion source 4 may be positioned in a number of locations down stream from the first ion source 3 and the broad scope of the invention should not be interpreted as being limited or focused to the embodiments shown and discussed in the figures. The other components and parts may be similar to those discussed in the APCI embodiment above. For clarification please refer to the description above.

The transport system 6 (shown generally in FIG. 1) may comprise a conduit 37 or any number of capillaries, conduits or devices for receiving and moving ions from one location or chamber to another. FIGS. 2–5 show the transport system 6 in more detail when it comprises a simple conduit 37. The conduit 37 is disposed in the source housing 10 adjacent to the corona needle 14 or UV lamp 32 and is designed for receiving ions from the electrospray aerosol. The conduit 37 is located downstream from the ion source 3 and may comprise a variety of material and designs that are well known in the art. The conduit 37 is designed to receive and collect analyte ions produced from the ion source 3 and the ion source 4 that are discharged into the ionization region 15 (not shown in FIG. 1). The conduit 37 has an orifice 38 that receives the analyte ions and transports them to another location. Other structures and devices well known in the art may be used to support the conduit 37. The gas conduit 5 may provide a drying gas toward the ions in the ionization region 15. The drying gas interacts with the analyte ions in the ionization region 15 to remove solvent from the solvated aerosol provided from the ion source 2 and/or ion source 3. The conduit 37 may comprise a variety of materials and devices well known in the art. For instance, the conduit 37 may comprise a sleeve, transport device, dispenser, capillary, nozzle, hose, pipe, pipette, port, connector, tube, orifice, orifice in a wall, coupling, container, housing, structure or apparatus. In certain instances the conduit may simply comprise an orifice 38 for receiving ions. In FIGS. 2–5 the conduit 37 is shown in a specific embodiment in which a capillary is disposed in the gas conduit 5 and is a separate component of the invention. The term "conduit" should be construed broadly and should not be interpreted to be limited by the scope of the embodiments shown in the drawings. The term "conduit" refers to any sleeve, capillary, transport device, dispenser, nozzle, hose, pipe, plate, pipette, port, connector, tube, orifice, coupling, container, housing, structure or apparatus that may be used to receive ions.

The detector 11 is located downstream from the second ion source 4 (detector 11 is only shown in FIG. 1). The detector 11 may comprise a mass analyzer or other similar device well known in the art for detecting the enhanced analyte ions that were collected and transported by the transport system 6. The detector 11 may also comprise any computer hardware and software that are well known in the art and which may help in detecting analyte ions.

FIG. 5 shows a similar embodiment to FIG. 4, but further comprises the first electrode 30 and the second electrode 33. In addition, this embodiment of the invention includes the separation of the sweep gas, nebulizing gas and drying gases. A separate drying gas source 44 is employed as described above in FIG. 3 to provide drying gas through drying gas ports 45 and 46.

Having described the invention and components in some detail, a description of how the invention operates is in order. The method of producing ions using a multimode ionization source 2 comprises producing a charged aerosol by a first atmospheric pressure ionization source such as an electrospray ionization source; drying the charged aerosol produced by the first atmospheric pressure ionization source; ionizing the charged aerosol using a second atmospheric pressure ionization source; and detecting the ions produced from the multimode ionization source. Referring to FIG. 2, the sample 21 is provided to the first ion source 3 by means of the nebulizer inlet 42 that leads to the longitudinal bore 28. The sample 21 may comprise any number of materials that are well known in the art and which have been used with mass spectrometers. The sample 21 may be any sample that is capable of ionization by an atmospheric pressure ionization source (i.e. ESI, APPI, or APPI ion sources). Other sources may be used that are not disclosed here, but are known in the art. The nebulizer conduit 19 has a longitudinal bore 28 that is used to carry the sample 21 toward the nebulizer tip 20. The drying device 23 may introduce a sweep gas into the ionized sample through the sweep gas conduit 25. The sweep gas conduit 25 surrounds or encloses the nebulizer conduit 19 and ejects the sweep gas to nebulizer tip 20. The aerosol that is ejected from the nebulizer tip 20 is then subject to an electric field produced by the first electrode 30 and the second electrode 33. The second electrode 33 provides an electric field that directs the charged aerosol toward the conduit 37. However, before the charged aerosol reaches the conduit 37 it is first subjected to the second ion source 4. The second ion source 4 shown in FIG. 2 is an APCI ion source. The invention should not be interpreted as being limited to the simultaneous application of the first ion source 3 and the second ion source 4. Although, this is an important feature of the invention. It is within the scope of the invention that the first ion source 3 can also be turned "on" or "off" as can the second ion source 4. In other words, the invention is designed in such a way that the sole ESI ion source may be used with or without either or both of the APCI and APPI ion source. The APCI or APPI ion sources may also be used with or without the ESI ion source.

FIG. 4 shows the second ion source 4 as an APPI ion source. It is within the scope of the invention that either, both or a plurality of ion sources are employed after the first ion source 3 is used to ionize molecules. In other words, the second ion source may comprise one, more than one, two, more than two or many ion sources that are known in the art and which ionize the portion of molecules that are not already charged or multiply charge by the first ion source 3. There are a number of important steps to make the multimode ionizer operate. For instance, the effluent must exit the nebulizer in a high electric field such that the field strength at the nebulizer tip is approximately $10^8$ V/cm or greater. This allows for the charging of the liquid molecules. The liquid is then converted by the nebulizer in the presence of the electric field to a charged aerosol. The charged aerosol may comprise molecules that are charged and uncharged. Molecules that are not charged using the ESI technique may potentially be charged by the APCI or APPI ion source. The spray needle may use nebulization assistance (such as pneumatic) to permit operation at high liquid flow rates. As mentioned above the charged aerosol is then dried. The mechanism for drying can vary and may include hot gas or electromagnetic radiation such as infrared or microwave. The combination of aerosol, ions and vapor is then exposed to either a corona discharge or vacuum ultraviolet radiation. This results in the second ion formation mechanism. Lastly, it is important to maintain a voltage gradient in the source such that the ions from both the ESI process and the second ion source are directed into the conduit 37. The ions will then travel through the transport system 6 to the detector 11 (transport system 6 is not shown generally in the FIGS. 2–5).

It is to be understood that while the invention has been described in conjunction with the specific embodiments thereof, that the foregoing description as well as the examples that follow are intended to illustrate and not limit the scope of the invention. Other aspects, advantages and modifications within the scope of the invention will be apparent to those skilled in the art to which the invention pertains.

All patents, patent applications, and publications infra and supra mentioned herein are hereby incorporated by reference in their entireties.

We claim:

1. A multimode ionization source, comprising:

(a) a source housing;

(b) a nebulizer disposed in said housing and having an orifice for providing a charged aerosol;

(c) a drying device adjacent to said orifice of said nebulizer for drying said charged aerosol;

(d) a corona needle disposed in said housing and positioned downstream from said nebulizer for further ionizing said charged aerosol;

(e) a conduit having an orifice adjacent to said corona needle for receiving ions from said charged aerosol;

(f) a first electrode interposed between the orifice of the nebulizer and the orifice of the conduit for producing ions from the orifice of the nebulizer; and (g) a second electrode interposed between the first electrode and the orifice of the conduit and positioned upstream from the corona needle for directing ions from the first electrode toward the orifice of the conduit.

2. A multimode ionization source as recited in claim 1, wherein said drying device for drying said charged aerosol is selected from the group consisting of an IR lamp, a laser, a heated surface, microwave lamp, a turbo spray device, and a heated gas conduit.

3. A multimode ionization source as recited in claim 1, wherein said housing is maintained at a pressure in the range of from 10 Torr to 2000 Torr.

4. A multimode ionization source, comprising:

(a) an electrospray ionization source for providing a charged aerosol;

(b) a drying device adjacent to said electrospray ionization source for drying said charged aerosol;

(c) an atmospheric pressure ionization source downstream from said electrospray ionization source for further ionizing said charged aerosol; and (d) a conduit adjacent to said atmospheric pressure ionization source and having an orifice for receiving ions from said charged aerosol;

wherein the drying device includes a first electrode and a second electrode, the second electrode assisting in steering ions toward the conduit.

5. A multimode ionization source as recited in claim 4, wherein said atmospheric pressure ionization source is an atmospheric pressure chemical ionization source (APCI).

6. The multimode ionization source as recited in claim 4, wherein the electrospray ionization source has a longitudinal axis and the conduit has a longitudinal axis and wherein the longitudinal axis of the electrospray ionization source is substantially orthogonal to the longitudinal axis of the conduit.

7. A mass spectrometer for multimode ion production, comprising:

(a) a multimode ionization source, comprising:

i. an electrospray ionization source for providing a charged aerosol;

ii. a drying device adjacent to said electrospray ionization source for drying said charged aerosol;

iii. an atmospheric pressure ionization source downstream from said electrospray ionization source for further ionizing said charged aerosol; and iv. a conduit adjacent to said atmospheric pressure ionization source and having an orifice for receiving ions from said charged aerosol;

wherein the drying device includes a first electrode and a second electrode, the second electrode assisting in steering ions toward the conduit; and (b) a detector downstream from said multimode ionization source for detecting said ions produced by said multimode ionization source.

8. A multimode ionization source as recited in claim 7, wherein said atmospheric pressure ionization source is an atmospheric pressure chemical ionization source (APCI).

9. The multimode ionization source recited in claim 7, wherein the electrospray ionization source has a longitudinal axis and the conduit has a longitudinal axis and wherein the longitudinal axis of the electrospray ionization source is substantially orthogonal to the longitudinal axis of the conduit.

10. A multimode ionization source as recited in claim 7, wherein said drying device for drying said source of ions is selected from the group consisting of an IR lamp, microwave, a vapor tube, a turbo spray device, and a heated gas conduit.

11. A method of producing ions using a multimode ionization source, comprising:

(a) producing a charged aerosol by electrospray ionization;

(b) drying said charged aerosol produced by said electrospray ionization;

(c) guiding the charged aerosol downstream using electrodes;

(d) ionizing said charged aerosol using a second atmospheric pressure ionization source downstream from the electrodes; and (e) detecting said ions produced from said multimode ionization source.

12. A method as recited in claim 11, wherein said second atmospheric pressure ionization source is an atmospheric pressure chemical ionization source (APCI).

13. A multimode ionization source, comprising:

(a) a first atmospheric pressure ionization source for providing a charged aerosol;

(b) a drying device adjacent to said first atmospheric pressure ionization source for drying said charged aerosol;

(c) a second atmospheric pressure ionization source downstream from said first atmospheric pressure ionization source for further ionizing said dried charged aerosol; and (d) a conduit adjacent to said second atmospheric pressure ionization source and having an orifice for receiving ions from said dried charged aerosol;

wherein the drying device includes a first electrode and a second electrode, the second electrode assisting in steering ions toward the conduit.

14. A method of producing ions using a multimode ionization source, comprising:

(a) producing a charged aerosol by a first atmospheric pressure ionization source;

(b) drying said charged aerosol;

(c) guiding the charged aerosol downstream from the first atmospheric pressure source using electrodes; and (d) ionizing said dried charged aerosol using a second atmospheric pressure ionization source downstream from the electrodes.

15. A multimode ionization source, comprising:

(a) an electrospray ionization source for providing a charged aerosol;

(b) a drying device adjacent to said electrospray ionization source for drying said charged aerosol;

(c) an atmospheric pressure ionization source downstream from said electrospray ionization source for further ionizing said charged aerosol; and (d) a conduit adjacent to said atmospheric pressure ionization source and having an orifice for receiving ions from said charged aerosol;

wherein the atmospheric pressure ionization source includes an atmospheric pressure photo-ionization source (APPI).

16. A mass spectrometer for multimode ion production, comprising:

(a) a multimode ionization source, comprising:

i. an-electrospray ionization source for providing a charged aerosol;

ii. a drying device adjacent to said electrospray ionization source for drying said charged aerosol;

iii. an atmospheric pressure ionization source downstream from said electrospray ionization source for further ionizing said charged aerosol; and iv. a conduit adjacent to said atmospheric pressure ionization source and having an orifice for receiving ions from said charged aerosol;

wherein the atmosheric pressure ionization source includes an atmospheric pressure photo-ionization source (APPI); and (b) a detector downstream from said multimode ionization source for detecting said ions produced by said multimode ionization source.

17. A method of producing ions using a multimode ionization source, comprising:

(a) producing a charged aerosol by electrospray ionization;

(b) drying said charged aerosol produced by said electrospray ionization;

(c) ionizing said charged aerosol using a second atmospheric pressure ionization source downstream from the electrodes; and (d) detecting said ions produced from said multimode ionization source;

wherein the second atmospheric pressure ionization source includes an atmospheric pressure photoionization source (APPI).

* * * * *